United States Patent
Heimbach et al.

(10) Patent No.: US 8,255,357 B1
(45) Date of Patent: Aug. 28, 2012

(54) SYSTEMS AND METHODS OF CONFIGURATION MANAGEMENT FOR ENTERPRISE SOFTWARE

(75) Inventors: James H. Heimbach, Flower Mound, TX (US); Brad M. Korber, Flower Mound, TX (US); Mark A. Trumble, Double Oak, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1241 days.

(21) Appl. No.: 11/610,328

(22) Filed: Dec. 13, 2006

Related U.S. Application Data (60) Provisional application No. 60/794,784, filed on Apr. 24, 2006.

(51) Int. Cl.
*G06F 17/30* (2006.01)

(52) U.S. Cl. .................................... 707/609; 707/781

(58) Field of Classification Search .................. 707/609, 707/610, 618, 999.2, 634, 705, 781
See application file for complete search history.

(56) References Cited

U.S. PATENT DOCUMENTS

| | | | |
|---|---|---|---|
| 5,835,911 A * | 11/1998 | Nakagawa et al. .................... 1/1 |
| 6,314,565 B1 * | 11/2001 | Kenner et al. ................. 717/171 |
| 6,418,555 B2 * | 7/2002 | Mohammed ................... 717/169 |
| 6,915,513 B2 * | 7/2005 | Duesterwald et al. ......... 717/168 |
| 7,085,824 B2 * | 8/2006 | Forth et al. ...................... 709/221 |
| 7,370,092 B2 * | 5/2008 | Aderton et al. ................ 709/220 |
| 7,409,403 B1 * | 8/2008 | Faraldo, II ............................ 1/1 |
| 7,552,125 B1 * | 6/2009 | Evans .................................... 1/1 |
| 7,653,732 B1 * | 1/2010 | Randall et al. ................. 709/227 |
| 2003/0074430 A1 * | 4/2003 | Gieseke et al. ................ 709/221 |
| 2005/0138068 A1 * | 6/2005 | Wilbur et al. .............. 707/104.1 |
| 2005/0228874 A1 * | 10/2005 | Edgett et al. ................... 709/220 |
| 2006/0179042 A1 * | 8/2006 | Bram et al. ......................... 707/3 |
| 2007/0093243 A1 * | 4/2007 | Kapadekar et al. ............ 455/419 |
| 2009/0100141 A1 * | 4/2009 | Kirkland et al. .............. 709/206 |

* cited by examiner

*Primary Examiner* — Angela Lie (57) ABSTRACT

Systems and methods of configuration management for enterprise software are disclosed. Some method embodiments comprise: storing updated configuration information for a software tool in a configuration database; periodically accessing the configuration database to retrieve updated configuration information; and when an updated configuration is found, replacing a configuration file for the software tool with an updated configuration file that incorporates the updated configuration information. In some embodiments, an API of the software tool may be automatically invoked to provide the software tool with updated configuration information. Using a separate configuration database in this manner enables a flexible web-based interface for many individuals to configure a shared tool without requiring downtime. Where needed, database access may be limited to authorized users. The configuration information may include user roles, listbox values, menu items, and other parameters affecting the user interface of the software tool.

15 Claims, 5 Drawing Sheets

| Country ▽ |
|---|
| Any |
| England |
| France |
| United States |
| Spain |
| Canada |
| Germany |

175
180

| State |
|---|
| Any |
| Alabama |
| California |
| Delaware |
| Florida |
| Idaho |
| Oregon |

SYSTEMS AND METHODS OF CONFIGURATION MANAGEMENT FOR ENTERPRISE SOFTWARE

CROSS-REFERENCE TO RELATED APPLICATIONS

This application claims priority to U.S. Provisional Patent Application No. 60894,784, filed Apr. 24, 2006, entitled "Systems and Methods of Configuration Management for Enterprise Software," by James Heimbach, et al., which is hereby incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A typical enterprise may develop and maintain numerous software applications with which employees perform their day-to-day tasks. Depending on the enterprise, the number of applications utilized by employees may number in the hundreds, even thousands. Moreover, as these applications evolve over time, each application may have many different versions associated with it.

To manage these applications, an enterprise may define an internal software configuration management team ("SCMT"), consisting of an individual or individuals, which is responsible for storing applications and their many versions of source code as well as providing particular versions of these applications to users upon request. To aid in the performance of its job, the SCMT may develop enterprise software tools to automate software configuration management. One such tool may provide a means to store source code for jointly developed enterprise software applications in a central location and to permit an authorized developer to "check-out", and later "check-in", portions of an application. The developer may be responding to a "trouble ticket" which contains a problem description and fields identifying a particular application and its version. Another enterprise software tool may provide a means for an end user to generate a "trouble ticket" by selecting criteria, or values, from multiple menus, or listboxes, defined within that tool. Once the user makes all necessary value selections from listboxes defined within the tool, the user may submit the "trouble ticket" to have the problem addressed by the developers.

Although software configuration management may be automated in this manner, the task of installing, configuring, and supporting enterprise software like these configuration management tools has not been. As applications evolve and change, user-selectable criteria available within these configuration management tools, specifically listboxes and values defined within those listboxes, must also evolve and change to keep pace with the needs of the users and developers. After all, users must be provided with current criteria with which to identify desired applications for trouble reporting. Additionally, the list of authorized developers seeking access to source code may change frequently as developers leave the enterprise and others join. In response to such changes in manpower, access rights to the enterprise software must be frequently updated.

To maintain listbox values and access rights, users and developers submit their requests directly to the SCMT, which, in turn, must respond to each request individually by manually updating listboxes and/or defining access rights. In a large enterprise, a timely response to such user/developer requests is impossible. The SCMT becomes a bottle-neck in the configuration management process as the number of user/developer requests far exceeds the manpower available to answer them. Furthermore, the tasks of updating access rights and listboxes may be tedious and error-prone. Lastly, the actual act of updating enterprise software like these configuration management tools also creates problems because the software may need to be stopped prior to updating them, causing users/developers utilizing the tools to be booted from their sessions, thereby losing on-going work, and preventing others from accessing the tools.

SUMMARY

Systems and methods of configuration management for enterprise software are disclosed. Some method embodiments comprise storing updated configuration information for a software tool in a configuration database, periodically accessing the configuration database to retrieve updated configuration information, and when updated configuration information is found, replacing at least one configuration file for the software tool with an updated configuration file that incorporates the updated configuration information. The replacement may occur while the software tool is running. The configuration file may be a text file. The updated configuration information may include new listbox values and relationships and/or new user roles. The configuration database is preferably a relational database that is accessible to users of the software tool via a web interface.

Some enterprise system embodiments of the invention comprise a change management tool having a configuration file identifying user interface listbox values, a configuration database accessible to users for specifying new listbox values and interrelationships, and a process that periodically accesses the configuration database to extract new listbox values and relationships, and that updates the configuration file accordingly. The change management tool may have a configuration file identifying user access rights that can also be updated by the process in accordance with information from the configuration database. The process may replace the configuration file with a new configuration file while the change management tool is running. Alternatively, the process may invoke an application programming interface (API) of the change management tool to update the configuration file. The enterprise system embodiment may further comprise a web server that provides access to the configuration database.

In some other embodiments of the invention, information carrier media provides a computer with software to implement a configuration management method. The software comprises a retrieval process, a conversion process, and an update process. The retrieval process is configured to periodically retrieve configuration information from a configuration database. The conversion process is configured to generate a text file containing the configuration information. The update process is configured to overwrite a configuration file of an active software tool with the text file. The configuration file may provide parameters for a user interface. These parameters may be listbox values and relationships between listbox values. The information carrier media may further comprise a web interface for the configuration database.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

NOTATION AND NOMENCLATURE

Certain terms are used throughout the following description and claims to refer to particular components. This document does not intend to distinguish between components that differ in name but not function. In the following discussion and in the claims, the terms "including" and "comprising" are used in an open-ended fashion, and thus should be interpreted to mean "including, but not limited to . . . ".

DETAILED DESCRIPTION

As explained above, existing systems and methods for configuration management of enterprise software are inefficient. These methods involve manually updating configuration information, such as listbox values and access rights. These methods are tedious and error-prone and may require bringing down the enterprise software to implement the updates, causing users accessing the software to be booted from their sessions, thereby losing on-going work, and preventing others from accessing the software.

To address these shortcomings, systems and methods for configuration management of enterprise software are disclosed. Users may access and store user-defined configuration information, including access rights and listbox values, in a configuration database using a web-based interface. The configuration database is updated and maintained without using the enterprise software. Process software may then retrieve configuration information stored in the configuration database, convert it to a form readable by enterprise software, and update configuration files of the enterprise software using this information. The configuration database, and configuration information stored within it, is distinct from the configuration files of the enterprise software. In this manner, enterprise software may be updated on a periodic basis, whether every 24 hours or every ten minutes, to reflect a listbox hierarchy defined by the users, user access rights, or other configuration information.

These methods for configuration management eliminate dependence on the SCMT to receive and respond to individual user requests, and reduce errors introduced by manually updating configuration information. Instead, the users bypass the SCMT and directly input configuration information into a dedicated configuration database using a web interface as often as desired. These methods also provide a means for updating enterprise software while it is running, thus eliminating the need to make the software unavailable on a periodic basis to update it. The enterprise software configuration may be updated as frequently as desired without adversely impacting the users.

Figure 1:
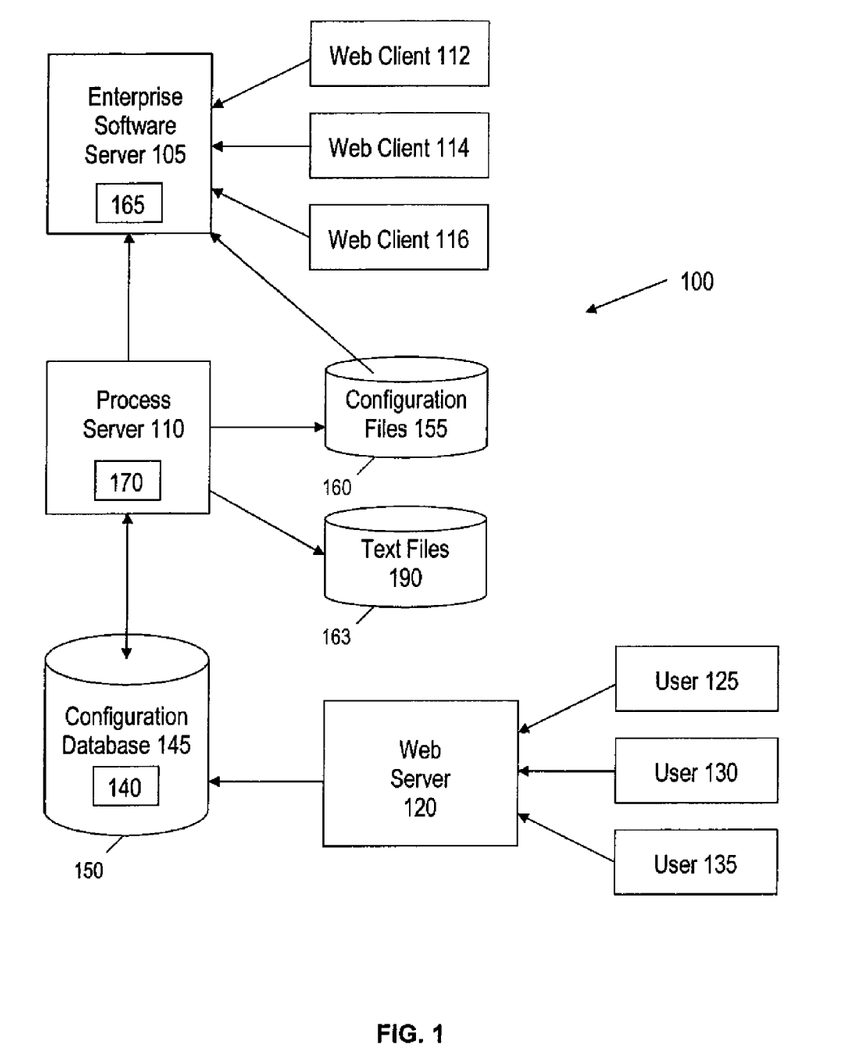
FIG. 1 is a block diagram of an illustrative configuration management system embodied in an enterprise network.

Referring to FIG. 1, an illustrative enterprise network 100 is depicted with an enterprise software server 105, a process server 110, one or more web clients 112, 114, 116, a web server 120, one or more users 125, 130, 135, a configuration database 145, configuration files 155, and text files 190. One or more users 125, 130, 135 may access a configuration database 145, which may be located on a network-accessible storage disk 150, to store user-defined configuration information 140 using a Web interface provided by the Web server 120. User access to this database 145 may be restricted to varying degrees, thus providing a granular level of security for the database 145 and the information 140 therein. More specifically, some users 125, 130, 135 may be permitted unlimited access to store information 140 in the database 145, while others may be permitted only limited access. The process server 110, which implements the configuration management method, may periodically access the configuration database 145 to retrieve configuration information 140 and use this information 140 to generate text files 190 located on a network-accessible storage disk 163. The process server 110 may use the text files 190 to update configuration files 155 located on a network-accessible storage disk 160. One or more web clients 112, 114, 116 may access enterprise software 165 located on an enterprise software server 105. During their sessions, the enterprise software 165 may periodically access the configuration files 155 and update itself using information contained in those files 155. Alternatively, the process server 110 may access the enterprise software 165 using its API and cause it to directly modify the configuration files 155.

Figure 2:
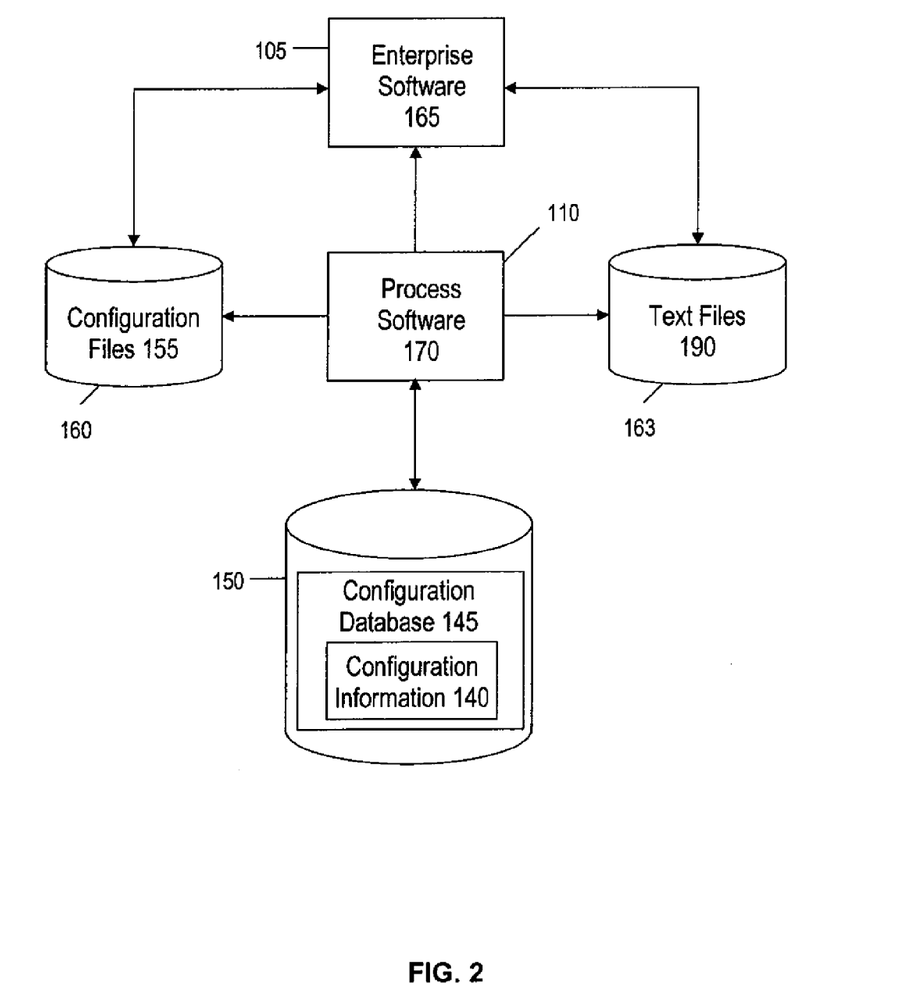
FIG. 2 is a block diagram of an illustrative configuration management system.

FIG. 2 depicts a block diagram wherein process software 170, located on the process server 110 (FIG. 1), implements a configuration management method. As described above, users 125, 130, 135 (FIG. 1) may access the configuration database 145 to store user-defined configuration information 140, which may consist of parameters, including user access rights and/or listbox values and their interrelationships, used to update the configuration of enterprise software 165. The process software 170 may generate text files 190 using the configuration information 140. The software 170 may use these files 190 to update the configuration files 155. When the enterprise software 165 accesses the configuration files 155, the software 165 may be updated to reflect configuration information 140 contained in these files 155. Alternatively, the process software 170 may access the enterprise software 165 using its API and direct the software 165 to modify the configuration files 155.

Figure 3:
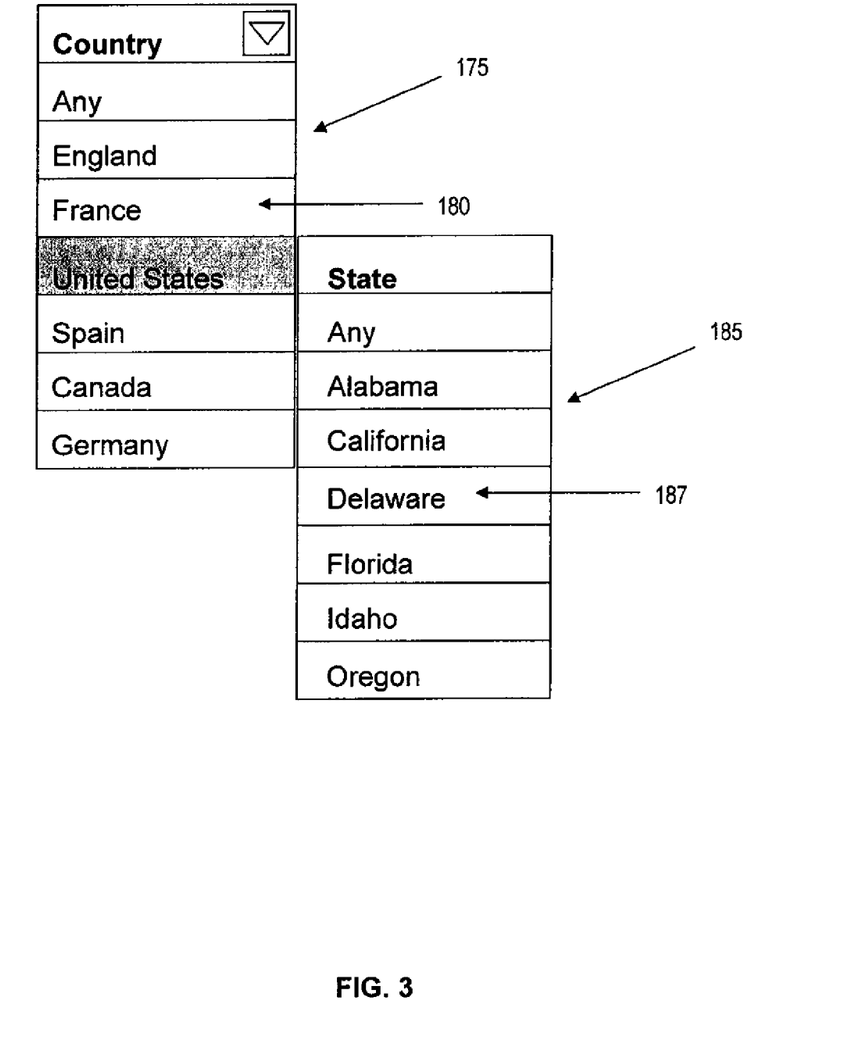
FIG. 3 is a block diagram of an illustrative listbox.

Within the enterprise software 165, there may be a menu hierarchy with which users make selections. Each available drop-down menu may be a listbox. Within each listbox, there may be a number of choices, or values, available for selection. FIG. 3 shows an illustrative listbox 175. In this particular example, the listbox 175 is named "Country". Within the listbox 175, there are a number of values 180 available for selection by the user, including "Any", "Canada", "England", "United States", and so on. Some values 180 within the listbox 175 may themselves be the names of sub-listboxes 185. In this figure, "United States" is a value 180 within the listbox 175 named "Country" as well as the name of a sub-listbox 185 which includes the sub-values 187 "Any", "Alabama", "California", and so on. As the user navigates the enterprise software 165, he may make value selections from many listboxes 175. All listboxes 175, and associated values 180, constitute the listbox hierarchy defined within the enterprise software 165. That hierarchy is maintained and periodically updated by the disclosed configuration management method. Users define listboxes 175 and associated values 180 and store that configuration information 140 in the configuration database 145, referring again to FIG. 2. The process software 170 may retrieve this information 140, generate text files 190 using this information 140, and update the configuration files 155 using the text files 190. When the enterprise software 165 accesses the configuration files 155, it will update itself to reflect the user-defined listboxes 175 and names 180 stored in the configuration database 145. In this manner, the listbox hierarchy contained within the enterprise software 165 may be defined and controlled by the users 125, 130, 135 according to their needs.

This configuration management method may also be used to define and control user (recall web client 112, 114, 116 from FIG. 1) access rights to the enterprise software 165. Similar to the listbox 175 definitions, configuration information 140 pertinent to user access rights, including authorized user identifications and passwords, may be stored in the configuration database 145. The process software 170 may periodically retrieve configuration information 140 related to user access rights and update the configuration files 155 such that only currently authorized users may access the enterprise software 165. After receiving authorization to access the enterprise software tool 165, new users may experience little to no wait time before the process software 170 updates the enterprise software 165 to include configuration information 140 regarding their access rights. Also, access rights for users whose authorization has been revoked may be modified in a minimal amount of time, thus preventing these individuals from continuing to access the enterprise software 165.

The process software 170 may consist of one or more script files containing instructions which, when executed, implement the configuration management method. The process software 170 may be configured to access and retrieve configuration information 140, convert this information to a text file 190 readable by the enterprise software 165, and update the configuration files 155, located on the storage disk 160, by over-writing these files 155 with the text files 190. The process software 170 may also be configured to access the API of the enterprise software 165 and execute a command causing the software 165 to update configuration files 155. The process software 170 may be configured to update the enterprise software 165 on a periodic basis, for example, every 24 hours. The process software may also be configured to update the configuration files 155 on a periodic basis, for example, every 10 minutes. Moreover, the process software 170 may be configured to update the configuration files 155 while the enterprise software 165 is running without interruption to web clients 112, 114, 116 accessing the software 165 or unavailability of the software 165 to others.

To perform these tasks, the process software 170 may consist of one or more script files, which, when executed, perform the various steps of the configuration management method. A main script file, referred to herein as "MAIN", may be configured to implement the method on a periodic basis, for example, every 24 hours or every ten minutes. MAIN may be configured to execute other script files, each designed to perform specific tasks that make up the method, including retrieving configuration information 140 from the configuration database 145, generating text files 190 using the configuration information 140, and updating the configuration files 155 using the text files 190. A script file may also be configured to cause the enterprise software 165 to update the configuration files 155.

As one example, MAIN may be configured to launch a script file, which, when executed, may access the configuration database 145, retrieve configuration information 140, and convert this information 140 into a form readable by the enterprise software 165. GENLB may produce as its output text file(s) 190 containing configuration information 140 in a format that is directly readable by the enterprise software 165 without further manipulation. MAIN may then over-write existing configuration files 155 with the text files 190 generated by GENLB. Once over-written, the configuration files 155 contain current configuration information 140 in a format that is readable by the enterprise software 165. As a second example, MAIN may launch another script filed, which, when executed, causes the enterprise software 165 to update the configuration files 155.

The process software 170 may be configured to generate and periodically update one or more configuration files 155 when the configuration information 140 stored within those files 155 changes. Each file 155 may contain different types of configuration information 140 required to maintain the enterprise software 165. For example, one file 155 may contain only listbox information, another file 155 user access rights, still another file 155 administrator information, and so on. Although the configuration management method may be implemented using a single configuration file 155 containing all information needed to configure the enterprise software 165, it is more desirable to use multiple configuration files 155 for several reasons. In the event that a problem occurs in generating a file 155, only a fraction of the information updated would be affected rather all of the information. Also, a configuration file 155 is only updated when the configuration information 140 stored within the file 155 has changed. If a single configuration file 155 were used containing all configuration information 140, the entire configuration file 155 would have to be updated every time any configuration information 140 changed, even if only one value 180 changed.

Figure 4:
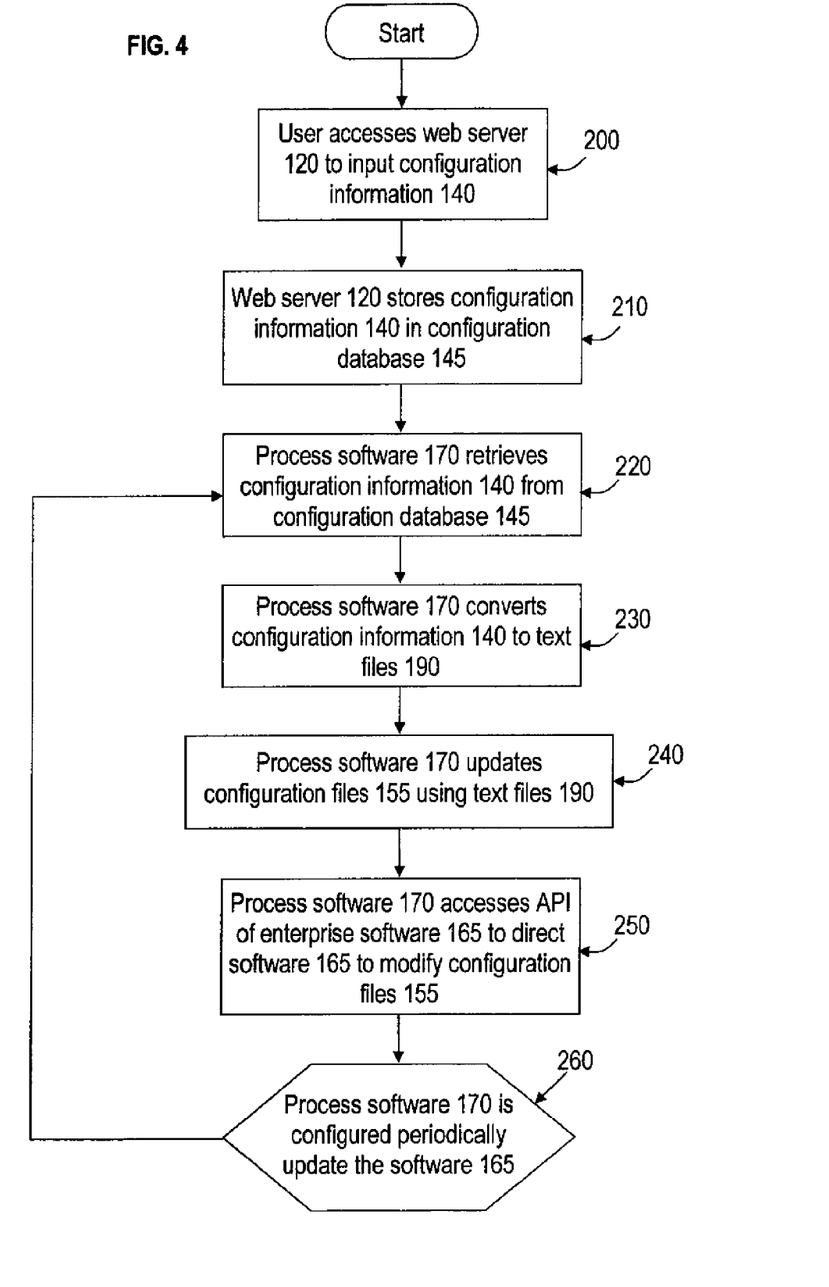
FIG. 4 is a logic diagram of an illustrative method for reconfiguring enterprise software.

Referring next to FIG. 4, a flowchart is provided to illustrate various method embodiments for updating enterprise software 165 using configuration information 140 stored by users 125, 130, 135 in a configuration database 145. The illustrated method embodiment applies whether the information 140 is directed to user access rights, listbox values and interrelationships, or other information necessary to configure the software 165. The method embodiment may begin when an authorized user 125, 130, 135 (FIG. 1) accesses the configuration database 145 through a web-interface 120 to store configuration information 140 (block 200). The user 125, 130, 135 may be required to log into this web-interface 120 before he is permitted to input information 140 using a typical web-based menu system. The user 125, 130, 135 may be permitted unlimited access to the information 140 stored in the database 145, or permitted only limited access. Information 140 input by the user 125, 130, 135 into the web-interface 120 may be automatically stored in the configuration database 145 (block 210).

On a periodic basis, the process software 170 (FIG. 2), which implements the configuration management method, may retrieve the configuration information 140 (block 220). Once retrieved, the process software 170 may convert this information 140 to text files 190 that are readable by the enterprise software 165 using, for example, script files like MAIN, (block 230). The process software 170 may then update the configuration files 155 containing the information 140 retrieved (recall block 220) by over-writing those files 155 with the text files 190 (block 240). The process software 170 may also access the API of the enterprise software 165 to direct the software 165 to directly modify the configuration files 155 (block 250). The process software 170 may be configured to update the enterprise software 165 only when information stored in the configuration files 155 has been modified. Otherwise, the process software 170 may not update the enterprise software 165.

As previously discussed, the process software 170 may be configured to update the enterprise software 165 on a periodic basis (block 260). With regards to configuration information 140 directed to user access rights, the software 170 may be configured to update the software 165 every 24 hours. More frequent updates, perhaps every ten minutes, may be required with regards configuration information 140 describing listbox values and their interrelationships. With all other configuration information 140, the process software 170 may be configured to update the enterprise software 165 even less frequently or perhaps only once. Because the configuration files 155 may contain different types of configuration information 140, for example, access rights and listbox definitions may be stored in different configuration files 155, the process software 170 may be configured to update the software 165 with particular configuration files 155 more or less frequently than others.

Although FIGS. 1 through 4 and supporting discussion define a configuration management method based on users 125, 130, 135 accessing a web-interface 120 to input configuration information 140 that is ultimately stored in the configuration database 145, one skilled in the art may readily appreciate that other methods of storing configuration information 140 may be utilized. For example, authorized users may be permitted direct access to the configuration database 145, making the use of a web-interface 120 unnecessary.

These figures and supporting discussion also depict process software 170 that accesses the configuration database 145 to retrieve configuration information 140. One skilled in the art may readily appreciate that other methods of retrieving configuration information 140 may be utilized. For example, the web-interface 120 may be configured to generate an output file containing configuration information 140 extracted from the configuration database 145. The process software 170 may then retrieve that output file as an alternative to accessing the configuration database 145 to retrieve configuration information 140.

These figures and supporting discussion also depict a configuration management method that may be used to reconfigure enterprise software 165 whose function is to permit a user to generate a "trouble ticket" using a listbox hierarchy defined within the software 165 or to allow a developer, with access rights, to "check-out", and later "check-in", source code for a particular enterprise application. One skilled in the art may readily appreciate that the configuration management method disclosed herein may be utilized to update other software tools where frequent reconfiguration is desired but difficult to impossible to perform manually due to the number of users and configuration parameters defined within the tool. Moreover, the configuration information 140 stored in the configuration database 145 is not limited to listbox definitions and user access rights, either for the software 165 depicted in FIGS. 1 through 4 or any other tool which may be reconfigured using the disclosed methods. Configuration information 140 may consist of any information necessary to reconfigure a software tool.

Figure 5:
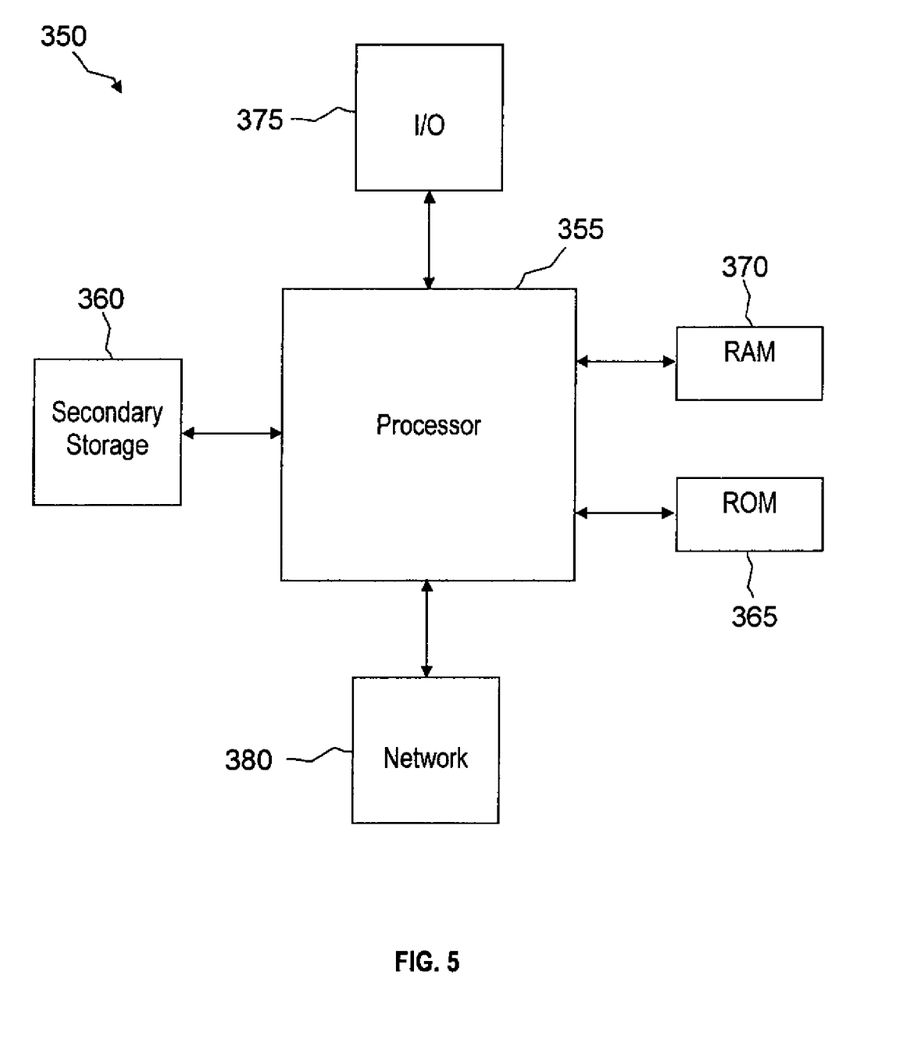
FIG. 5 is an illustrative general-purpose computer system suitable for implementing the disclosed systems and methods.

The systems, methods and software described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 350 includes a processor 355 (which may be referred to as a central processor unit or CPU) that is in communication with memory devices including secondary storage 360, read only memory (ROM) 365, random access memory (RAM) 370, input/output (I/O) 375 devices, and network connectivity devices 380. The processor may be implemented as one or more CPU chips.

The secondary storage 360 is typically comprised of one or more disk drives or tape drives and is used for non-volatile storage of data and as an over-flow data storage device if RAM 370 is not large enough to hold all working data. Secondary storage 360 may be used to store programs which are loaded into RAM 370 when such programs are selected for execution. The ROM 365 is used to store instructions and perhaps data which are read during program execution. ROM 365 is a non-volatile memory device which typically has a small memory capacity relative to the larger memory capacity of secondary storage. The RAM 370 is used to store volatile data and perhaps to store instructions. Access to both ROM 365 and RAM 370 is typically faster than to secondary storage 360. I/O 375 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 380 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 380 devices may enable the processor 355 to communicate with an Internet or one or more intranets. With such a network connection, it is contemplated that the processor 355 might receive information from the network, or might output information to the network in the course of performing the above-described method steps. Such information, which is often represented as a sequence of instructions to be executed using processor 355, may be received from and outputted to the network, for example, in the form of a computer data signal embodied in a carrier wave Such information, which may include data or instructions to be executed using processor 355 for example, may be received from and outputted to the network, for example, in the form of a computer data baseband signal or signal embodied in a carrier wave. The baseband signal or signal embodied in the carrier wave generated by the network connectivity 380 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 355 executes instructions, codes, computer programs, scripts which it accesses from hard disk, floppy disk, optical disk (these various disk based systems may all be considered secondary storage 360), ROM 365, RAM 370, or the network connectivity devices 380.

While various system and method embodiments have been shown and described herein, it should be understood that the disclosed systems, methods and software may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A configuration management method that comprises:
storing updated configuration information for an enterprise software tool in a configuration database, wherein the enterprise software tool is accessible to a user, and wherein the updated configuration information comprises updated user access rights for the enterprise software tool;
periodically accessing the configuration database to retrieve the updated configuration information;
when the updated configuration information is found, replacing at least one configuration file comprising user access rights for the enterprise software tool with an updated configuration file that incorporates the updated configuration information comprising the updated user access rights while the enterprise software tool is running without interruption to the user accessing the enterprise software tool; and
verifying the user's authority based on the updated user access rights before enabling continued access to the enterprise software tool.

2. The method of claim 1, wherein the at least one configuration file is a text file.

3. The method of claim 1, wherein the configuration database is a relational database that is accessible to users of the software tool via a web interface.

4. The method of claim 1, wherein the periodic accesses are performed at least once per day.

5. The method of claim 1, wherein the periodic accesses are performed at least once every ten minutes.

6. The method of claim 1, wherein the updated configuration information includes new listbox values and relationships.

7. The method of claim 6, wherein the software tool is a change management tool for enterprise software projects.

8. The method of claim 1, wherein the updated configuration information includes new user roles.

9. The method of claim 1, further comprising verifying a user's authority before enabling access to the configuration database.

10. The method of claim 1, further comprising securing approval from a designated user before designating new configuration information as suitable for an updated configuration file.

11. The method of claim 1, wherein the replacing is performed by invoking an application programming interface (API) of the enterprise software tool to cause the enterprise software tool to directly replace the at least one configuration file.

12. An enterprise system that comprises:
a change management tool having a configuration file identifying listbox values, a listbox hierarchy, and an interrelationship between the listbox values and the listbox hierarchy for a user interface comprising at least one listbox;
a configuration database stored on a non-transitory computer readable media for specifying a new listbox value, a new listbox hierarchy, and a new interrelationship for the user interface;
a web server, implemented on a computer, accessible to users that provides access to the configuration database, accepts a user input comprising the new listbox value, the new listbox hierarchy, and the new interrelationship for the user interface, stores the input in the configuration database when designated by a user, and generates an output file containing the new listbox value, the new listbox hierarchy, and the new interrelationship for the user interface; and
a process that retrieves the output file and that updates the configuration file accordingly, wherein the process updates the configuration file with the new listbox value, the new listbox hierarchy, and the new interrelationship for the user interface while the change management tool is running without interruption to a user accessing the change management tool.

13. The system of claim 12, wherein the process invokes an application programming interface (API) of the change management tool to update the configuration file.

14. The system of claim 12, wherein the change management tool has a configuration file identifying user access rights, wherein the user access rights are updated by the process in accordance with information from the configuration database.

15. The system of claim 12, wherein the change management tool is accessible to a plurality of users.

* * * * *